United States Patent [19]
Eiler

[11] 3,738,442
[45] June 12, 1973

[54] VEHICLE CHASSIS FRAME
[75] Inventor: Peter Eiler, Langenfeld, Germany
[73] Assignee: Leo Gottwald K.G., Dusseldorf, Germany
[22] Filed: Mar. 9, 1971
[21] Appl. No.: 122,423

[30] Foreign Application Priority Data
Mar. 11, 1970 Germany............... P 20 11 410.7

[52] U.S. Cl.............. 180/64 R, 212/38, 280/106 R
[51] Int. Cl............................................. B60k 5/12
[58] Field of Search............. 180/64 R; 280/106 R; 212/38

[56] References Cited
UNITED STATES PATENTS
| | | | |
|---|---|---|---|
| 3,323,608 | 6/1967 | Eggert | 280/106 R X |
| 1,872,386 | 8/1932 | Andren | 280/106 R |
| 727,682 | 5/1903 | Poidatz | 180/64 |
| 2,596,478 | 5/1952 | Gerhardt | 280/106 R X |
| 2,719,044 | 9/1955 | Walter | 280/106 R |

FOREIGN PATENTS OR APPLICATIONS
571,361   1/1924   France............... 280/106

Primary Examiner—Leo Friaglia
Assistant Examiner—John A. Pekar
Attorney—Toren & McGeady

[57] ABSTRACT

A chassis frame for a vehicle, such as a truck crane, is formed of a pair of longitudinally extending, laterally spaced z-shaped support members. Each support member has a vertically arranged web with a lower flange extending inwardly toward the other support member and an upper flange of greater width than the lower flange extending outwardly from the web. The lower flange extends generally perpendicularly to the web while the upper flange is composed of a first portion extending angularly upwardly and outwardly to a second portion which extends outwardly normal to the web and a third portion which forms the outer longitudinal edge of the upper flange and extends angularly downwardly from the outer end of the second portion. Vertical plates are secured to the inside of the web and are supported at their lower ends on the lower flange, these plates act as supports for members mounted on the chassis frame. With this chassis frame the drive motor of the vehicle can be supported on the lower flanges between the web of the support members.

6 Claims, 4 Drawing Figures 3,738,442

INVENTOR
PETER EILER
BY Toren and McGeady
ATTORNEYS

VEHICLE CHASSIS FRAME

SUMMARY OF THE INVENTION

The present invention is directed to a chassis frame for a vehicle such as a truck crane and, more particularly, it concerns the shape of the support members forming the chassis by which the members mounted on the chassis can be advantageously positioned and supported.

Vehicle chassis or undercarriages are frequently used for truck cranes with the crane turntable being mounted on a ball-bearing slewing gear supported on the chassis frame. Due to the construction of presently known chassis frames, the driving motor for the vehicle is disadvantageously positioned above the front axle and, further, a costly welding construction is required.

Due to the performance requirements of vehicles such as truck cranes, which requirements are constantly increasing, a relatively high position of the total center of gravity of the vehicle results when the driving motor is positioned above the front axle. With a relatively high center of gravity the vehicle is adversely effected with regard to its stability. Moreover, the requirement for increased performance characteristics in such vehicles results in the need for larger drive motors and often there is not sufficient space on the chassis frame for positioning the motor above the front axle of the vehicle. Further, due to the arrangement of the motor, its turning or locking angle of the front wheels is limited. At the present time with the drive motors being used it is not possible to obtain any significant turning angle for the front wheels of the vehicle.

Another feature of such vehicle constructions which is of considerable importance is the exceedingly high bending and torsion forces generated in the chassis frame, this is especially true in truck cranes. To provide a construction capable of withstanding these high forces, the presently known chassis frames are formed as welded structures which are both expensive and time-consuming to build.

Accordingly, the primary object of the present invention is to provide a chassis frame capable of supporting a drive motor in a manner particularly suitable for truck cranes which have a desirable center of gravity and which can be easily steered. Further, another object is to provide a chassis frame construction which, in view of the high loads and wear experienced, has superior resistance to bending and torsion. Another object of the invention is to provide a relatively inexpensive arrangement which is simple to construct.

Therefore, in accordance with the present invention, a chassis frame is provided formed of a pair of Z-shaped longitudinally extending laterally spaced support members which are arranged to support a vehicle drive motor positioned between the support members. These support members are formed of a single section having flanges at their upper and lower ends and, as a result, do not involve any welding seam which extends over the length of the member. Further, the use of such a Z-shaped support member considerably simplifies the manufacture of the chassis frame and also increases its useful life. The only welding necessary in forming the chassis frame is the integral attachment between the ends of the support members and box-shaped members within which outriggers or similar components are located. It has been found that Z-shaped support members are capable of withstanding the different loads experienced in truck crane operation, and particularly they are able to withstand the extremely high bending and torsion forces which normally occur in such operation.

In a chassis frame embodying the present invention, the drive motor along with its transmission and gear system can be arranged within the frame so that the vehicle's center of gravity is relatively low with excellent stability being obtained. Further, with such a chassis frame construction, the drive motor can be located between the front and rear axles of the vehicle and though a large and considerably wide motor is used, the vehicle can be steered easily and controlled in a most effective manner.

In a preferred embodiment of the invention, the longitudinally extending support members are disposed in laterally spaced parallel relationship and each support member is formed of a vertically arranged web with a lower flange extending inwardly toward the other support member and an upper flange of considerably greater width than the lower flange extending outwardly from the upper edge of the web in a direction opposite to that of the lower flange. The support members have substantially the same shape and are spaced apart a sufficient distance so that the various elements positioned on or within the frame can be easily accommodated in a particularly suitable manner. In truck cranes the crane turntable and the drive motor are supported on and within the chassis frame, respectively. Preferably, the upper flange of each support member extends laterally outwardly for a sufficient distance so that it is positioned at least above the outer edge of the vehicle wheels on the chassis frame and the outer edge of the upper flange is bent angularly downwardly from the remainder of the flange at its outer edge. With this arrangement of the upper flange of the support member, a particularly effective protection for the vehicle and vehicle wheels are provided.

Another preferred feature of the support member is provided by the inner portion of the upper flange being inclined upwardly and outwardly from the upper edge of the web with the intermediate portion of the flange extending normally to the web. The inner inclined support surface on the upper flange provides an excellent support surface for units bearing on the chassis frame, for example the turntable for the crane. With such an arrangement, the crane turntable can be welded in position between the two support members and the turntable can be installed in a completed condition so that no subsequent work is required other than the welded attachment to the support members. This arrangement provides a considerable saving in assembly time and costs.

Additional supports can be incorporated with the support members, for example vertically extending plates can be secured to the lower flange and the inner side of the web for providing additional support for elements mounted on and supported by the chassis frame. For example, the crane turntable can be supported between the opposite support members with the vertically extending plates providing additional support. Further, the chassis frame constructed in accordance with the present invention permits the placement of both the crane turntable and the drive motor between the front and rear axles of the vehicle while providing sufficient space for effective handling of the truck crane.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
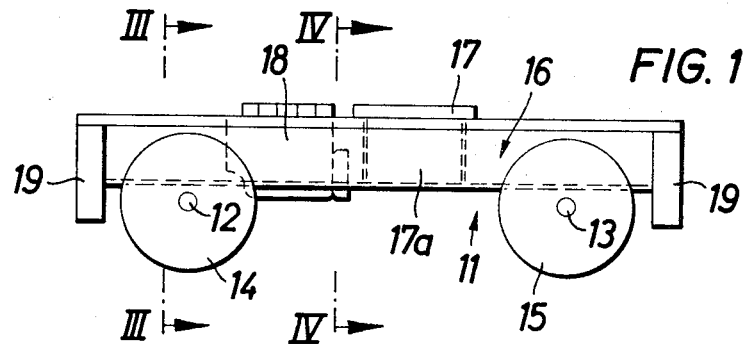
FIG. 1 is a side view of a schematic illustration of a truck crane chassis.
Figure 2:
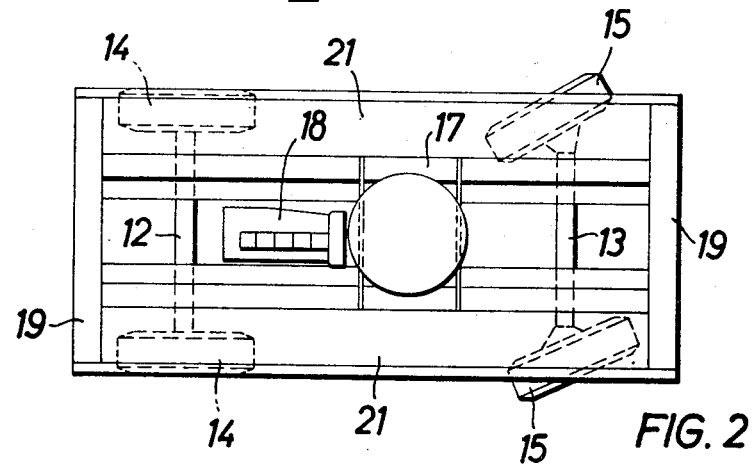
FIG. 2 is a plan view of the chassis shown in FIG. 1.

In the drawing a chassis or undercarriage 11 for a crane vehicle is shown schematically, having a front axle 12 on which tires 14 are mounted and a rear axle 13 on which tires 15 are mounted. Mounted on the chassis 11 between the front axle 12 and rear axle 13 are a crane turntable support 17 and a drive motor 18 for the vehicle. Both the turntable support 17 and the drive motor 18 include a gear or transmission arrangement, not shown, which is built into the frame 16 of the chassis so that the turntable support and the drive motor do not project to any appreciable amount above the upper edge of the chassis frame 16. At the opposite ends of the frame support boxes 19 are provided for outrigger arms or similar elements.

The chassis frame is formed of two Z-shaped longitudinally extending laterally spaced support members 21 which are formed of a single or monolithic construction of their entire length. At their opposite ends, the support members 21 are welded to the support boxes 19 which maintains the spacing of the support members at a sufficient distance apart so that the turntable support 17 and the drive member 18 can be arranged between them, note FIGS. 3 and 4. With the drive motor 18 supported between and on the support members forming the chassis frame 16, the very high bending and torsion forces which are developed can be easily absorbed and the chassis frame can be constructed in a simple and inexpensive manner.

Figure 3:
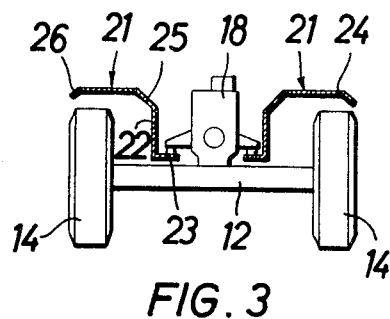
FIG. 3 is a sectional view taken along the line III—III in FIG. 1.
Figure 4:
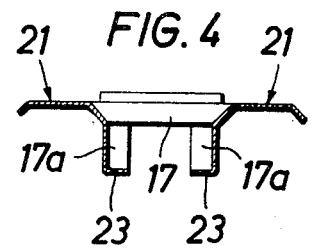
FIG. 4 is a sectional view taken along the line IV—IV in FIG. 1.

Each of the longitudinally extending support members 21 is composed of a vertically extending web 22, a lower flange 23 extending inwardly toward the opposite support member from the lower end of the web, and an upper flange 24 secured to and extending from the upper end of the web in an outward direction opposite to the direction of the lower flange 23. As indicated in FIGS. 3 and 4, the upper flange 24 includes an inner or first portion 25 which slopes upwardly and outwardly from the upper end of the web to a second portion which extends normally of the web and a third portion extends angularly outwardly and downwardly from the outer ends of the second portion. The sloping or angularly disclosed surface 25, as shown in FIG. 4, acts as a support for the turntable support 17. Further, vertical plates 17a are positioned perpendicularly to the inner faces of the webs 22 and are supported at their lower ends against the lower flanges 23. These vertical plates 17a afford additional support for the turntable support 17. As can be noted in FIGS. 3 and 4, the upper flanges 24 are considerably wider than the lower flanges 23 and extend laterally from the webs for a sufficient distance so that they are located at their outer ends above the outer edges of the vehicle wheels 14 and 15 and, as a result, the outer or third portions 26 of the upper flanges provide protection for the vehicle wheels.

Although in the embodiment illustrated in the drawing only the wheels 15 are arranged to be steered, it is possible to arrange the wheels 14 in a steerable manner though the turntable support 17 and the drive motor 18 are arranged within the chassis frame between the front and rear axles of the vehicles. Therefore, the turning angle of the wheels 14 would not be affected by the position of the drive motor 18.

What is claimed is:

1. A chassis frame for a wheel mounted truck crane supporting a drive motor and a turntable support for the truck crane, comprises a pair of longitudinally extending laterally spaced generally Z-shaped support members, each said support member comprises a substantially vertically extending web, an upper flange extending transversely from the upper end of one side of said web and a lower flange extending transversely from the lower end of the opposite side of said web, said lower flange extending from said web in the direction toward the other said support member, said lower flange being narrower than said upper flange, and said support members arranged for supporting the drive motor in a position spaced laterally opposite said webs of said support members and mounted on said lower flanges thereof, wherein the improvement comprises that said upper flange comprises a first portion which relative to said web slopes angularly upwardly and outwardly from the upper end of said web and forms a support surface for the turntable support extending between the upper ends of said support member.

2. A chassis frame, as set forth in claim 1, wherein at least two substantially vertical plates are supported at their lower ends on the upper surface of said lower flange of each said support member and extend upwardly therefrom for affording additional support for the turntable support.

3. A chassis frame, as set forth in claim 1, wherein said webs of said support plates are disposed in parallel relationship.

4. A chassis frame, as set forth in claim 1, wherein said upper flange comprises a second portion extending outwardly from the outer end of said first portion which is spaced from said web, said second portion located above the wheel of the truck crane, and a third portion secured to the outer end of said second portion which is remote from said first portion and sloping outwardly over and downwardly toward but spaced upwardly from the wheels of said truck crane for providing protection for the truck crane wheels.

5. A chassis frame, as set forth in claim 4, wherein a box-shaped member is located at each of the opposite ends of said support member and said box-shaped member extends between and is secured to each of said support members.

6. A chassis frame, as set forth in claim 1, wherein said web and said upper and lower flanges are formed of a single monolithic section.

* * * * *